(12) United States Patent
Alshehri et al.

(10) Patent No.: US 9,006,299 B2
(45) Date of Patent: Apr. 14, 2015

(54) METHOD FOR REMOVAL OF METAL IONS FROM AN AQUEOUS SOLUTION

(75) Inventors: Saad M. Alshehri, Riyadh (SA); Tansir Ahamad, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 13/521,507

(22) PCT Filed: Jul. 12, 2011

(86) PCT No.: PCT/EP2011/003483
§ 371 (c)(1),
(2), (4) Date: Feb. 13, 2013

(87) PCT Pub. No.: WO2013/007270
PCT Pub. Date: Jan. 17, 2013

(65) Prior Publication Data
US 2014/0148521 A1    May 29, 2014

(51) Int. Cl.
| B01J 39/08 | (2006.01) |
| C02F 1/42 | (2006.01) |
| B01J 39/18 | (2006.01) |
| B01J 45/00 | (2006.01) |
| B01J 39/04 | (2006.01) |
| B01J 41/04 | (2006.01) |
| B01J 41/12 | (2006.01) |

(52) U.S. Cl.
CPC ............. *B01J 39/185* (2013.01); *B01J 45/00* (2013.01); *C02F 1/42* (2013.01); *B01J 39/04* (2013.01); *B01J 41/04* (2013.01); *B01J 41/125* (2013.01)

(58) Field of Classification Search
USPC ...................................... 521/26, 39
See application file for complete search history.

(56) References Cited

U.S. PATENT DOCUMENTS 5,380,658 A * 1/1995 Matsuki et al. ............... 435/181
2010/0288124 A1* 11/2010 Wang ............................. 95/134

FOREIGN PATENT DOCUMENTS

| EP | 425268 | 5/1991 |
| EP | 425268 A2 * | 5/1991 |
| WO | WO-2012/046095 A1 * | 4/2012 |
| WO | WO-2013/007270 A1 * | 1/2013 |

OTHER PUBLICATIONS

Facchin G. et al.; "Thermosetting Resins and Azo Dyes Based on Phosphazenes", Journal of Inorganic and Organometallic Polymers, vol. 9, No. 3, Jan. 1, 1999, pp. 113-150.*
Wycisk R. et al.; "Sulfonated polyphosphazene ion-exchange membranes", Journal of Membrane Science, Elsevier Scientific Publ. Company. Amsterdam, NL, vol. 119, No. 1, Oct. 2, 1996, pp. 155-160.*
Jones L. et al.; "Coion exclusion properties of polyphosphazene ion-exchange membranes", Journal of Membrane Science, Elsevier Scientific Publ. Company. Amsterdam, NL, vol. 162, No. 1-2, Sep. 1, 1999, pp. 135-143.*
Giacomo Facchin et al.; "Thermosetting Resins and Azo Dyes Based on Phosphazenes", Journal of Inorganic and Organometallic Polymers, vol. 9, No. 3, Jan. 1, 1999, pp. 113-150.
PCT/EP2011/003483; PCT International Search Report and Written Opinion of the International Searching Authority dated Mar. 2, 2012.

* cited by examiner

*Primary Examiner* — Peter D Mulcahy
*Assistant Examiner* — Henry Hu
(74) *Attorney, Agent, or Firm* — Renner, Otto, Boisselle & Sklar, LLP

(57) ABSTRACT

The present invention relates to a method for removal of metal ions from an aqueous solution, which comprises contacting the aqueous solution with a phosphazene-formaldehyde resin as well as an ion exchange resin comprising a phosphazene-formaldehyde resin.

9 Claims, No Drawings

METHOD FOR REMOVAL OF METAL IONS FROM AN AQUEOUS SOLUTION

The present invention relates to a method for removal of metal ions from an aqueous solution and an ion-exchange resin which can be utilized therein.

Ion-exchange resins which are used for the removal of metal ions from aqueous solutions are well known and commercially attractive, especially for the use in water softening or water purification applications, and especially for the removal of toxic products from aqueous industrial effluents. Some of these commercial ion-exchange resins have some selectivity for certain metal ions at selective pH.

Ion-exchange resins of sufficient selectivity and cheapness have thus many potentially important applications. These include the removal of polluting heavy metal ions in the effluent from electroplating or metal pickling baths. Another possible application is the recovery of metals from dilute mine dump leachings where selective solvent extraction using low molecular weight chelating agents is being used commercially, but problems of solvent and complexing agent loss prevent wider use of solvent extraction, see G. Cigget et al., Chem & Ind. 23, 2019 (1976). The possibility of medical use, e.g. for selective removal of poisoning metal ions, could be a welcome benefit of selective resins.

In the past few decades of research carried out on the synthesis of highly selective ion-exchange resins, a number of resins with improved selectivity for heavy metal ions have been reported. Poly(8-hydroxy-5-azoquinolinephenylacrylate-formaldehyde) resin has been synthesized and described in Journal of Applied Polymer Science, Vol. 104, 797-802 (2007) for use for the removal of heavy metal ions from aqueous solutions. Any reaction carried out on a preformed polymer leads to the formation of some non-selective or non-absorbing defect structures on the chain, which cannot be removed. Multiple reactions compound the formation of defects considerably and hence limit the selectivity of a resin. The costs of such chemical transformations also limit greatly the applicability of the chelating resins formed in the prior art.

Another type of chelating polymer has been made by direct synthesis using the condensation of phenol, formaldehyde and iminodiacetic acid, see Japan Kokai, 75, 92, 991 (1975) and 75, 107, 092 (1975). Also the condensation of polyamines, formaldehyde and 8-hydroxyquinoline is a similar chelating polymer, see F. Vernon, Chemistry and Industry, 634 (1977). However, in this case (and in most other attempts to form chelating polymers) well known, strong chelating structure units are used in the polymers. These powerful chelating units have precluded the development of high selectivity. Another common type of phenol/formaldehyde resin is that formed with various mono- or di-primary amines, especially under acid catalysed conditions, see U.S. Pat. No. 3,976,571. In these cases, many different reactions can and do occur at the one amine group. Because of this, these resins do not have high metal selectivity.

A further disadvantage of ion-exchange resins of the prior art is that they can be used only in cases where the concentration of the metal is not very low.

It is thus an object of the present invention to provide a method for removal of metal ions from an aqueous solution, which method overcomes the drawbacks of the prior art. Especially a method shall be provided showing high selectivity to specific metal ions and which is particularly useful where the concentration of the metal ions is low. Further, a respective ion-exchange resin shall be provided.

The object is achieved by a method for removal of metal ions from an aqueous solution, which comprises contacting the aqueous solution with a phosphazene-formaldehyde resin.

Preferably, the metal ions are selected from the group consisting of heavy metal ions, such as lead and transition metals, such as cadmium, copper, zinc and nickel.

In one embodiment, the pH of the aqueous solution is from 6-8, preferably 7, wherein the aqueous solution optionally contains a respective buffer.

Even preferred, the aqueous solution is ground water, sea water, or waste water, preferably industrial waste water.

In one preferred embodiment, the phosphazene-formaldehyde resin is separated from the aqueous solution after contacting therewith, preferably by filtration.

Preferably, the metal ions are removed from the separated phosphazene-formaldehyde resin.

Also preferred, the phosphazene-formaldehyde resin removed from the metal ions is recycled and/or re-used.

According to the invention is also an ion-exchange resin comprising a phosphazene-formaldehyde resin.

Preferably, the phosphazene-formaldehyde resin is obtainable by reacting hexaminocyclotriphosphazene hexammoniumchloride ($\{NP(NH_2)_2\}_3 \cdot 6NH_4Cl$) and formaldehyde (HCHO) in an aqueous environment.

More preferred, the molar ratio of hexaminocyclotriphosphazene hexammoniumchloride and formaldehyde is from 1:1 to 1:3, preferably 1:1.

Surprisingly, it was found that the inventive method can be successfully utilized for removal of metal ions from an aqueous solution, wherein metal ions can be removed with high selectivity, even if the metal ions are only present in a lower concentration.

The strongest and most selective chelating resins are obtained when the phosphazene and formaldehyde are used in about a 1:1 molar ratio.

The resins utilized in the method of the present invention are white and insoluble in water showing strong and specific absorption for metal ions, i.e. probably complexing the metal ions.

Additional advantages and features of the present invention can be taken from the following detailed description of preferred embodiments which are not to be understood to limit the invention in any way.

Preparation of Phosphazene-Formaldehyde Resin

Information regarding the preparation of phosphazene-formaldehyde resin can be also taken from the non published application PCT/IB2010/054458.

Example 1

5.5 g (0.01 mol) of $[NP(NH_2)]_3 \cdot 6NH_4Cl$ was mixed with 0.0830 ml (0.01 mol) of (37-40%) formaldehyde at room temperature. The reaction beaker became slightly hot and resulting mixture became sticky paste like favicol. After 10 minutes of reaction the white color sticky paste was washed with acetone several times and dried at room temperature. Resulting white color powder is obtained in 80% yield.

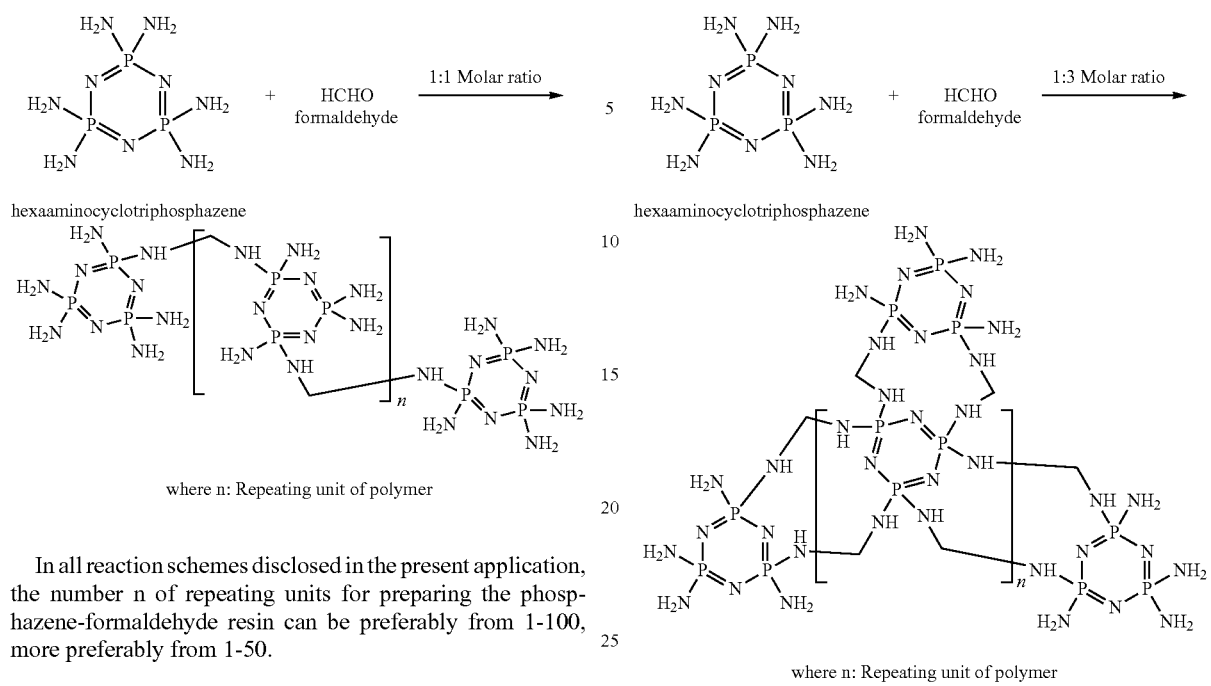

where n: Repeating unit of polymer

In all reaction schemes disclosed in the present application, the number n of repeating units for preparing the phosphazene-formaldehyde resin can be preferably from 1-100, more preferably from 1-50.

Example 2

5.5 g (0.01 mol) of $[NP(NH_2)]_3 \cdot 6NH_4Cl$ was mixed with 1.30 ml, (0.02 mol) of (37-40%) formaldehyde at room temperature. The reaction beaker became slightly hot and resulting mixture became sticky paste like favicol. After 10 minutes of reaction the white color sticky paste was washed with acetone and distilled water several times and dried at room temperature. Resulting white color powder is obtained in 84% yield.

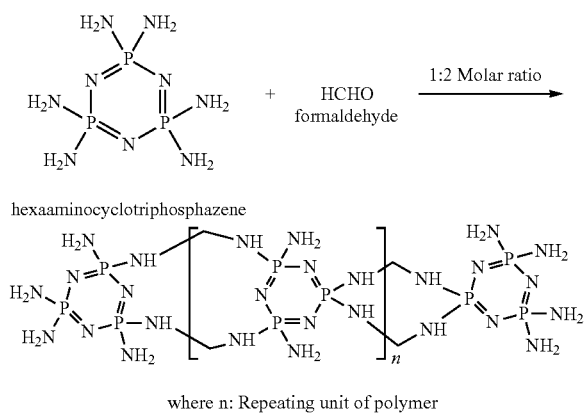

where n: Repeating unit of polymer

Example 3

5.5 g (0.01 mol) of $[NP(NH_2)]_3 \cdot 6NH_4Cl$ was mixed with 2.30 ml (0.03 mol) of (37-40%) formaldehyde at room temperature. The reaction beaker became slightly hot and resulting mixture became sticky paste like favicol. After 10 minutes of reaction the white color sticky paste was washed with acetone several times and dried at room temperature. Resulting white color powder is obtained in 80% yield.

Of course, other molar ratios can also be chosen, wherein different molar ratios may affect the polymeric structure significantly.

Ion-Exchange Example

The metal ion uptake studies were done by batch techniques. The resins were washed either diluted HCl and then washed with double distilled water to remove all the excess acid. The dried resin was used for further experiments. In the batch technique, a suspension of the resin 100 mg with four different initial concentration of the metal (25 µg/mL, 50 µg/mL, 100 µg/mL, 200 µg/m) solution was agitated for a definite time period (24 h) over a hot plate/magnetic stirrer. The pH of the solution was adjusted to neutral using suitable buffer. The resin was then filtered off, and thoroughly washed with demineralised water. The metal ion concentration was determined using spectrophotometrical analysis, such as UV-visible spectroscopy. The ion exchange resin can be reused after washing with diluted HCl.

The experiments were repeated three times and the percentage of absorbed metal ions and the distribution coefficient ($K_d$) were calculated using the following equation:

$$\text{Metal Ion Uptake } (\%) = \frac{(C_i - C_f)}{C_i} \times 100$$

Where $C_i$ is the initial concentration and $C_f$ is the final concentration (µg/ml) of metal ions.

$$\text{Distribution Coefficient} \left(\frac{ml}{g}\right) = \frac{\text{mmole of metal on the sorbent}}{\text{mmol of metal in solution}} \times \frac{10 \text{ mL of solution}}{\text{g of resin}}$$

In the batch experiment, different concentrations of metal ions were mixed with a constant weight of resin. The results revealed that when the ratio value of metal ions (μg/ml) and resin (g) was increased the absorption of metal ion decreased at room temperature after 24 h and at neutral solution (pH; 7). The result of this studied is summarized in table 1.

TABLE 1

Metal ions uptake behaviors[a] of synthesized resin in different metal to resin ratio

| Resin (molar ratio)[b] | Metal (μg/ml)/resin (mg) | Absorbed Metals ions (Percentage)[c] | | | | |
|---|---|---|---|---|---|---|
| | | Ni(II) | Cu(II) | Zn(II) | Cd(II) | Pb(II) |
| 1:1 | 1:4 | 100 | 100 | 100 | 100 | 100 |
| | 1:2 | 97 | 100 | 100 | 95 | 93 |
| | 2:3 | 65 | 72 | 62 | 65 | 60 |
| | 1:2 | 45 | 48 | 45 | 43 | 40 |
| 1:2 | 1:4 | 97 | 100 | 95 | 97 | 96 |
| | 1:2 | 95 | 98 | 93 | 95 | 90 |
| | 2:3 | 60 | 70 | 60 | 60 | 60 |
| | 1:2 | 40 | 45 | 40 | 40 | 38 |
| 1:3 | 1:4 | 80 | 85 | 80 | 75 | 75 |
| | 1:2 | 72 | 75 | 70 | 70 | 72 |
| | 2:3 | 50 | 55 | 50 | 52 | 50 |
| | 1:2 | 30 | 37 | 35 | 32 | 30 |

[a]absorption condition, pH-7, room temperature, contact time 24 h.
[b]phospazene and formaldehyde molar ratio
[c]result is ±1%

The features disclosed in the foregoing description and in the claims may, both separately and in any combination thereof, be material for realizing the invention in diverse forms thereof.

The invention claimed is:

1. Method for removal of metal ions from an aqueous solution, which comprises:
   reacting hexaminocyclotriphosphazene hexammoniumchloride ($\{NP(NH_2)_2\}_3 \cdot 6NH_4Cl$) and formaldehyde (HCHO) in an aqueous environment to form a phosphazene-formaldehyde resin; and
   contacting the aqueous solution with the phosphazene-formaldehyde resin.

2. Method according to claim 1, wherein the metal ions are selected from the group consisting of heavy metal ions.

3. Method according to claim 1, wherein the pH of the aqueous solution is from 6 to 8, wherein the aqueous solution optionally contains a respective buffer.

4. Method according to claim 1, wherein the aqueous solution is ground water, sea water, or waste water.

5. Method according to claim 1, wherein the phosphazene-formaldehyde resin is separated from the aqueous solution after contacting therewith.

6. Method according to claim 5, wherein the metal ions are removed from the separated phosphazene-formaldehyde resin.

7. Method according to claim 6, wherein the phosphazene-formaldehyde resin removed from the metal ions is recycled and/or re-used.

8. Method according to claim 1, wherein the metal of said metal ions are is selected from the group consisting of lead and transition metals.

9. Method according to claim 1, wherein the metal of said metal ions is selected from the group consisting of cadmium, copper, zinc and nickel.

* * * * *